United States Patent [19]

Bruski et al.

[11] Patent Number: 5,495,923
[45] Date of Patent: Mar. 5, 1996

[54] ELASTOMERIC SHOCK ABSORBER

[75] Inventors: Marek Bruski, Kańczuga; Andrzej Chmielewski, Przeworsk; Józef Kędzior, Warsaw; Antoni Kubicki, Przeworsk; Kazimierz Milczarski; Wojciech Popławski, both of Warsaw; Eugeniusz Strzyż, Kańczuga, all of Poland

[73] Assignee: Kamax S.A. Fabryke Urzadzeń Mechanicznych, Kańczuga, Poland

[21] Appl. No.: 198,316

[22] Filed: Feb. 18, 1994

[30] Foreign Application Priority Data

Apr. 28, 1993 [PL] Poland ............................. 298757

[51] Int. Cl.⁶ .................................................. F16F 9/30
[52] U.S. Cl. .......................... 188/268; 188/322.19; 188/317
[58] Field of Search .................................. 188/282, 268, 188/313, 316, 317, 322.15, 322.19; 267/136, 139, 140, 140.11, 116, 118

[56] References Cited

U.S. PATENT DOCUMENTS

| 3,306,598 | 2/1967 | Jarrett et al. | 188/268 |
|---|---|---|---|
| 3,379,317 | 4/1968 | Carlson | 188/268 |
| 3,711,080 | 1/1973 | Kendall | 188/268 |
| 3,804,446 | 4/1974 | Warrener | 188/268 |
| 3,819,060 | 6/1974 | Kendall et al. | 188/268 |
| 3,876,044 | 4/1975 | Kendall et al. | 188/317 |
| 3,968,862 | 7/1976 | Gorges et al. | 188/268 |
| 3,971,551 | 7/1976 | Kendall et al. | 188/282 |
| 3,976,287 | 8/1976 | Kendall et al. | 188/322.15 |

FOREIGN PATENT DOCUMENTS

| 2540764 | 4/1977 | Germany | 188/268 |
|---|---|---|---|
| 3041549 | 11/1986 | Germany | |
| 122000 | 12/1985 | Poland | |

*Primary Examiner*—Robert J. Oberleitner
*Assistant Examiner*—Chris Schwartz
*Attorney, Agent, or Firm*—Lackenbach Siegel Marzullo Aronson & Greenspan

[57] ABSTRACT

An elastomeric shock absorber having enhanced damping characteristics comprises a casing filled with a compressible elastomer; a piston rod immersed in the elastomer; a piston head mounted on the piston rod and the piston head is provided with connecting ports communicating with the front and back spaces of the piston and is also equipped with a mobile member. The mobile member is located between a surface from which the connecting ports emerge as well as a ring or like stop block. The stop block is mounted on a section of the piston head facing a flow chamber, wherein the piston head moves into and out of an outer cylindrical surface of the casing and wherein at least one groove is provided on an inner surface of the casing, which together with the outer cylindrical surface of the piston head form a flow chamber shaped as a solid of revolution, the solid of revolution being selected from the group comprising a cone, a ring, a torus and any combination thereof.

5 Claims, 4 Drawing Sheets

5,495,923

ELASTOMERIC SHOCK ABSORBER

BACKGROUND AND DESCRIPTION OF THE INVENTION

BACKGROUND OF THE INVENTION

The invention relates to an elastomeric shock absorber.

The hitherto known shock absorber disclosed in the Polish patent description No. 122000 comprises a casing filled with compressible elastomer and a piston rod immersed therein. The head of the piston rod is provided with connecting ports communicating with front and back chambers of the head, and is equipped with a ring or light stop block mounted on the head's section facing the chamber, the chamber being filled with elastomer. A mobile member is located between the stop block or ring and the surface of piston head from which the ports emerge. The aforementioned mobile member closes the ports with delay while the piston rod is immersing into the chamber with elastomer and opens them during the backward movement of the piston rod.

Other known devices meant to absorb shocks, provided with a cylinder and a piston are shown in U.S. Pat. Nos. 3,819,060, 3,971,551, 3,876,044 and 3,711,080. However, a disadvantage of these shock absorbers which are provided with pistons is that it is necessary to insure the proper cooperation of the peripheral sealing of the piston with the cylindrical surface of the casing.

It is one important object of the present invention to provide means to expand the possibilities of manipulating the shock absorber performance characteristic and more specifically to obtain increased range of shock energy absorption coefficient while preserving high durability of the assembly.

SUMMARY OF THE INVENTION

As it unexpectedly turned out, the required forming of the characteristics is insured by the new embodiment of the elastomeric shock absorber in which the connecting ports, communicating spaces at the front and at the back of the piston head, are connected with the cylindrical surface of the piston head with the application of a channel in which there is at least one groove in the inner surface of the casing. This groove together with the cylindrical surface of the piston head forms a flow chamber, but shaped as a solid of revolution, and the solid being selected from the group comprising a cone, a ring, a torus and any combination of the mentioned solids. It is an advantage of the present invention to enable the manipulation of the shock absorber performance characteristic over a wide range, which is achieved by the appropriate choice of the cross-section of the aperture and that of the channel connecting it with the cylindrical surface of the piston head, and also by the appropriate choice of the shape of the flow chamber.

According to the present invention the groove may be formed on the entire profile of the chamber's inner surface or may have a shape of a slot provided along the axis of the chamber. The amount, the arrangement and the shape of the grooves determine the desired performance characteristic of the shock absorber.

According to the present invention it is advantageous to provide a channel which links the parts, communicating with the front and back spaces of the piston head, with the cylindrical surface of the head.

Further technological improvement is achieved if the port, communicating the front and back spaces of the piston head, is fed to the point where the cylindrical surface of the head is adjacent the head's front facing the stuffing-box.

BRIEF DESCRIPTION OF THE DRAWINGS

The various embodiments of the present invention will hereinafter be described more specifically by reference to the following drawings wherein.

DESCRIPTION OF THE PREFERRED EMBODIMENTS

Figure 1:
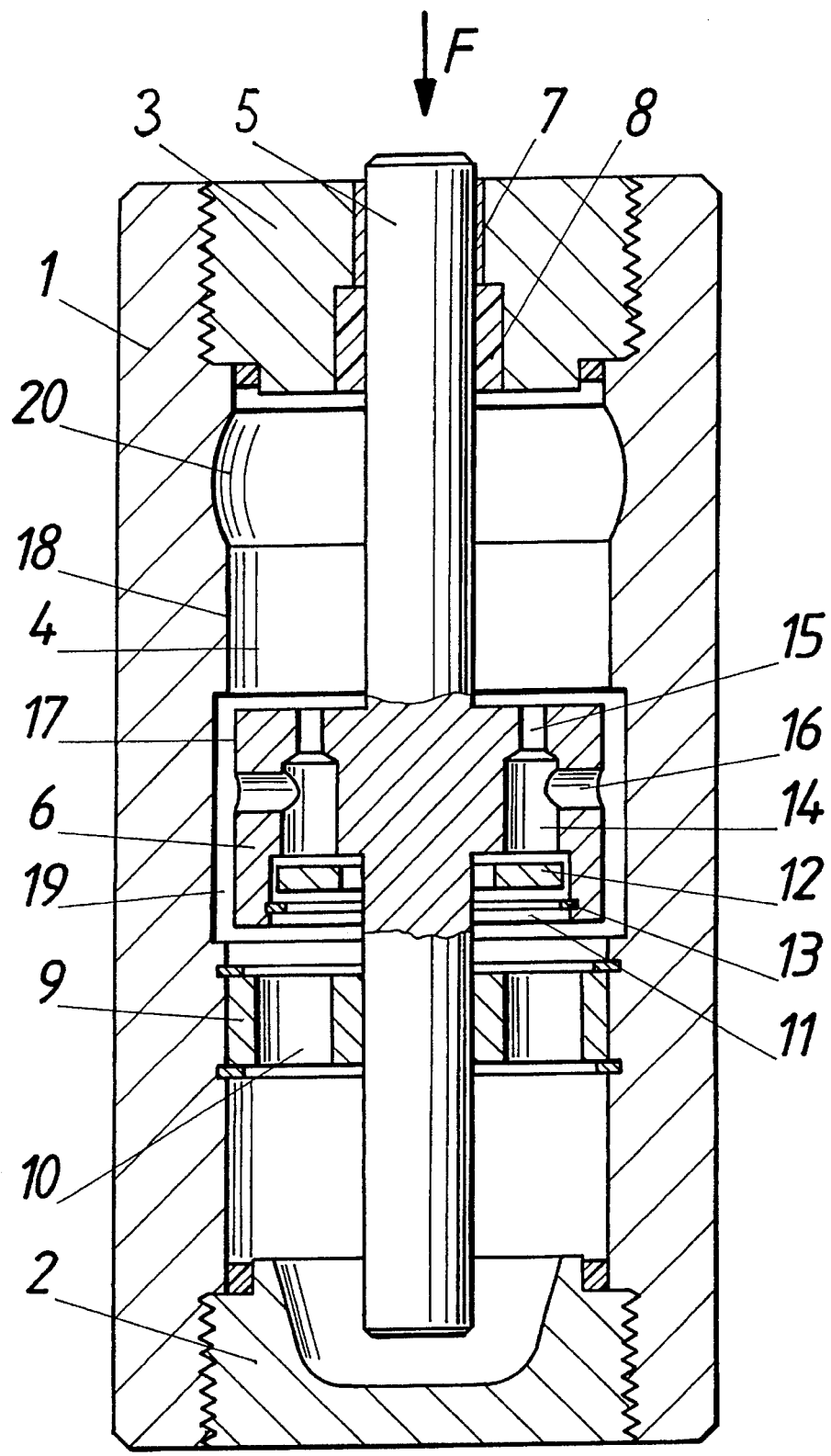
FIG. 1 is a longitudinal section of a compressed elastomeric shock absorber equipped with two flow chambers, one of which has a shape of a part of a torus and the other has a shape of a ring.

The elastomeric shock absorber as depicted in FIG. 1 includes a cylindrical casing 1, which is tightly closed from one side by means of a closure member 2 and from the other side by means of a stuffing-box 3 (end cap; end seal, etc. The interior of the casing forms a chamber 4 filled with compressible and precompressed elastomer, in which a piston rod 5 is immersed having a piston head 6 mounted thereon. The piston head 6 is formed of a solid of revolution with a diameter smaller than the inner diameter of the casing. The said piston rod is guided outside through the stuffing-box provided with sliding means 7 and sealing means 8. In the casing the piston rod is slidably mounted inside a guide means 9 provided with flow ports 10, the said guide means 9 being located out of reach of the piston head. Supporting the piston rod in the casing inside the guide bar, located near the bottom section, increases the resistance of the piston rod to buckling and insures the centric guiding of the piston head in the casing with some backlash between the piston head and the casing's wall. On the front surface of the piston head, in a section facing the guide means there is provided a cavity 11, in which a mobile annular member 12 is located, the said mobile member being closed by a ring or stop block 13. Moreover, the head is equipped with connecting ports 14, which communicate the said cavity with the second front surface of the head, the said ports forming an orifice 15 at the section facing the stuffing-box. The connecting ports merge into the cylindrical surface 17 of the piston head through the channel 16. On the inner surface 18 of the casing, in the area of the terminal position of the head, there are provided two grooves 19 and 20, which form two flow chambers: one shaped as a ring, the other shaped as part of a torus.

Figure 2:
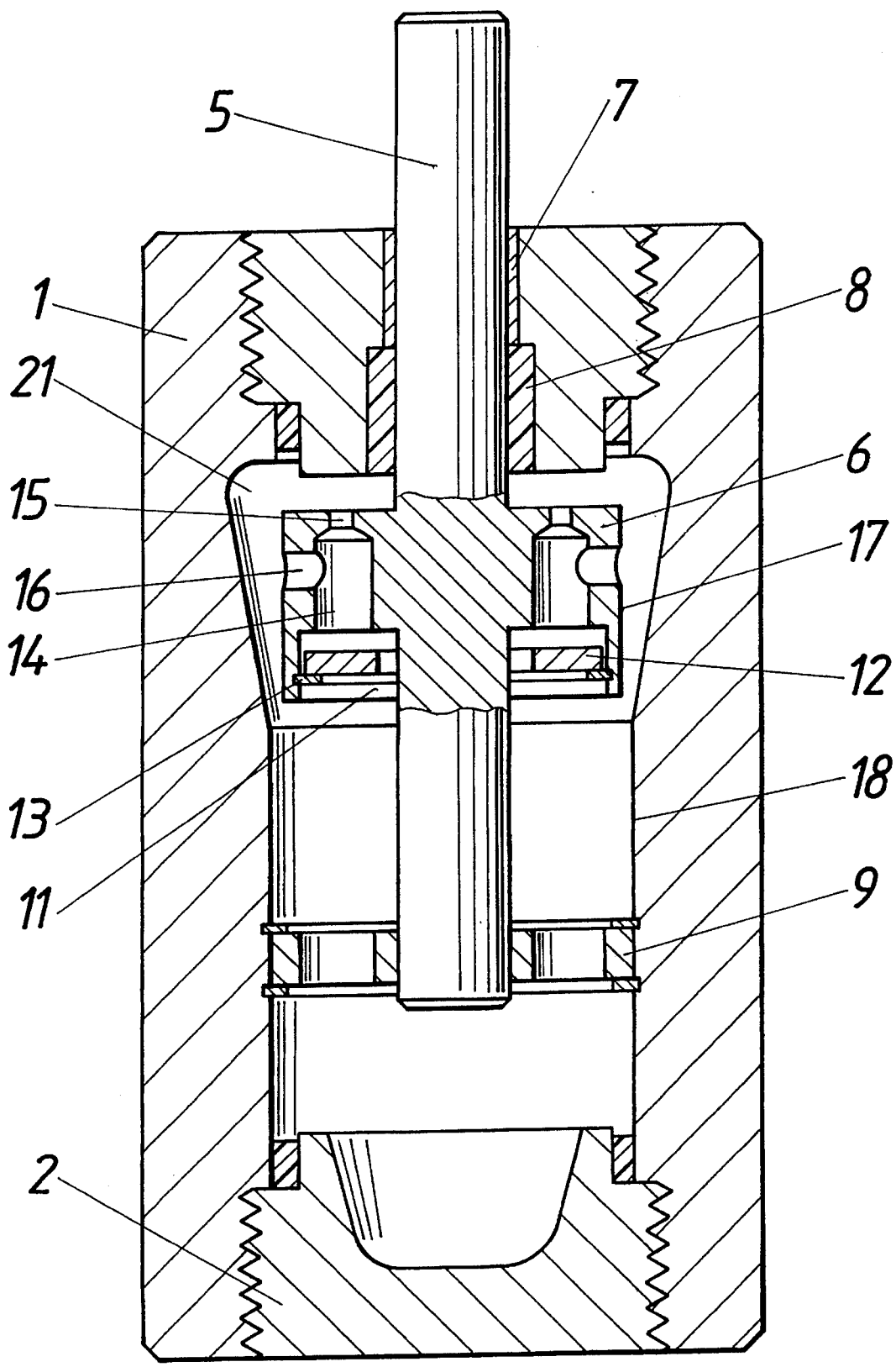
FIG. 2 is a fragmentary sectional view of a shock absorber equipped with one flow chamber having a shape of a hollow cone.
Figure 3:
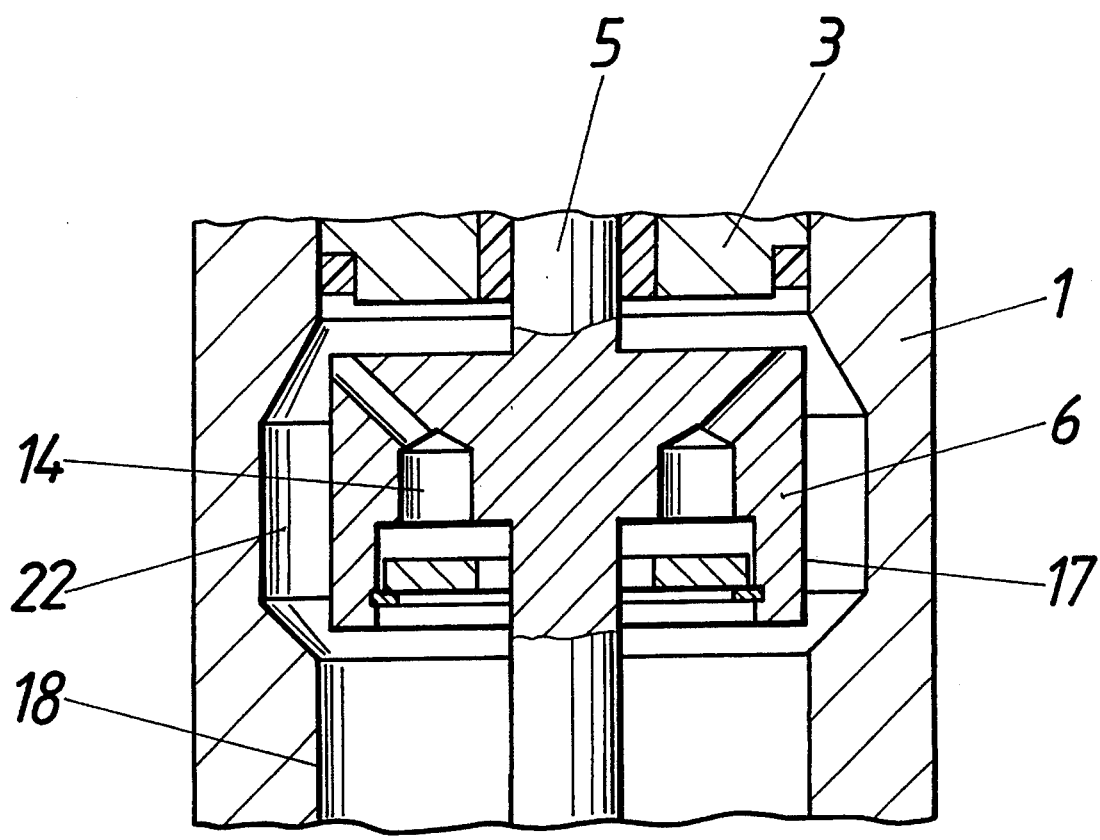
FIG. 3 is a fragmentary sectional view of a shock absorber equipped with a flow chamber of different shape.

In a variant of the invention depicted in FIG. 2, on an inner surface 18 of the casing there is provided a flow chamber 21, which is shaped as a hollow cone and adheres to the stuffing-box.

In a different variant of the invention the groove on an inner surface 18 of the casing may form a flow chamber 22 which constitutes of two hollow cones merging with a ring. Morover the port 14, communicating the front and back spaces of piston head, is fed to the point where the cylindrical surface of the head is adjacent the head's front facing the stuffing-box.

Figure 4:
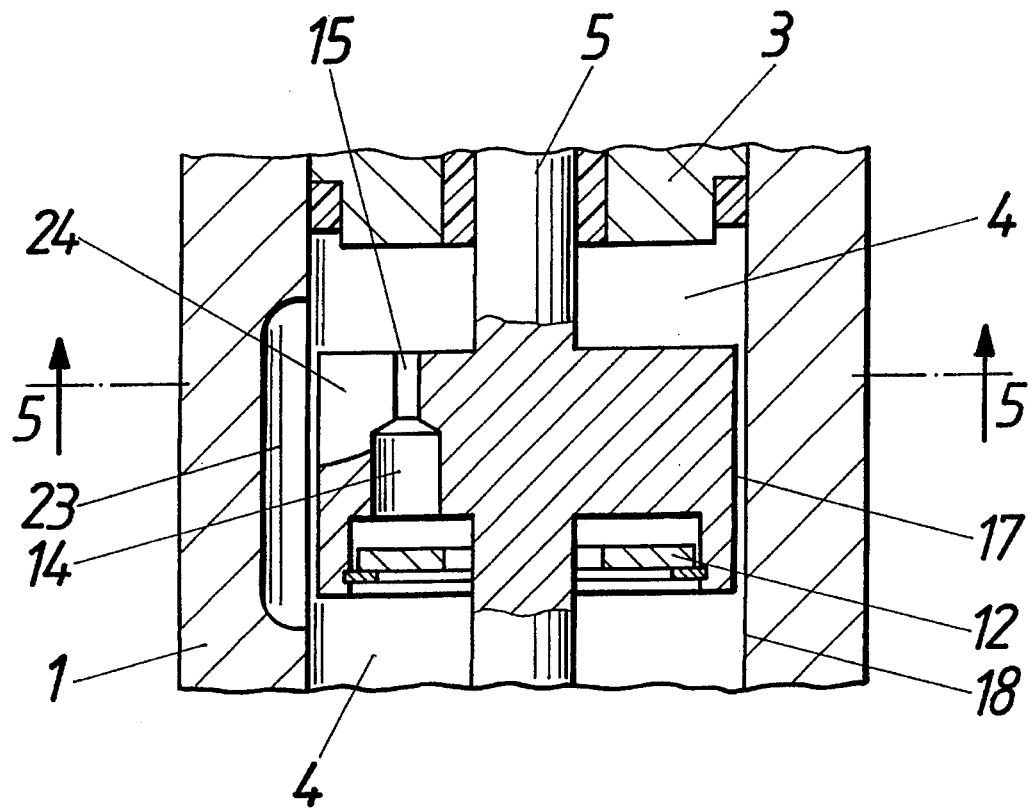
FIG. 4 is a fragmentary longitudinal section of a shock absorber having a flow chamber shaped as grooves, and the channels shaped as radial incisions.
Figure 5:
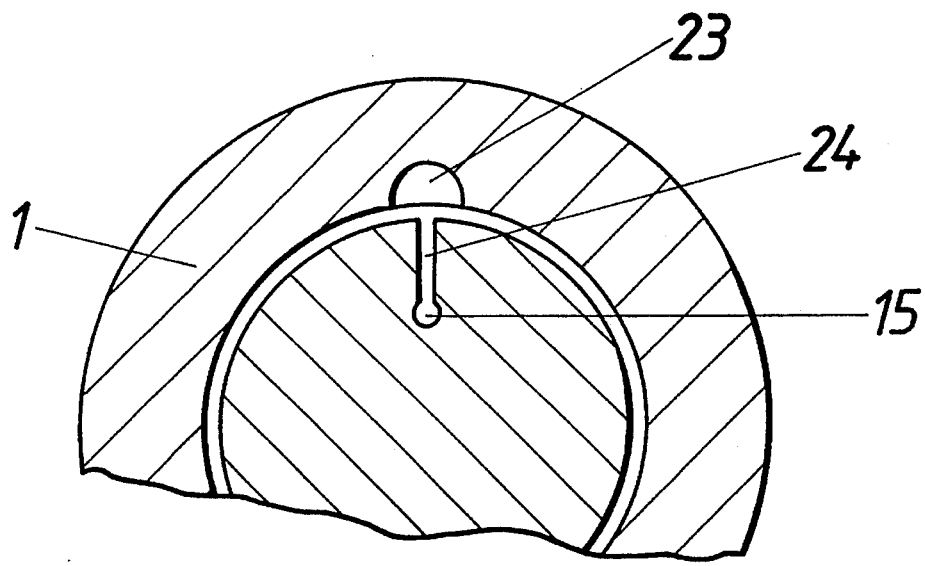
FIG. 5 is a fragmentary transverse sectional view of elastomeric shock absorber taken along line A—A of FIG. 4.

In FIGS. 4 and 5 an alternate embodiment of the present invention is disclosed which includes flow chambers 23 which are shaped as grooves on the inner surface 18 of the casing. Such formed flow chamber is located above the entry of the channel 24 linking the aperture 14 with the cylindrical surface 17 of the piston head. The channel is shaped as a radial cut or incision made on a front surface of the piston head facing the stuffing-box.

The elastomeric shock absorber according to the invention operates in the following manner: with no impact forces imposed, the piston rod is located in a casing filled with a precompressed elastomer, the said piston rod being at its initial rest position. The impact force exceeding a predetermined value imposed on the piston rod so as to cause the latter to move inwardly in the casing (1) from the initial position toward the terminal position and the said movement proceeds relative to the increase of said impact force. During the movement of the piston rod 5, directed to the inside of the shock absorber, the movable member 12 is pressed, as an impact of the elastomer's pressure, upon the outlet of the connecting port 14 and thus the flow of elastomer is stopped. This stage of the piston rod's movement is accompanied by elastomer flow only between the cylindrical surface 17 of the piston head and the inner surface 18 of the casing. According to the invention, as the piston rod returns to its normal rest position there proceeds a known flow of the elastomer from one section of the chamber 4 to its other section through the aperture 14, while the said flow is limited by the orifice 15. Simultaneously the elastomer is displaced through the flow chamber 19, 20, 21 or 22 provided as peripheral grooves on the surface 18 of the casing; or through a flow chamber 24 shaped as a slot on the inner surface 18 of the casing. From the flow chamber the elastomer passes to the connecting port 14 directly or, in another variant of the invention, by means of the channel 16. At this stage of the piston rod movement the elastomer emerges from the connecting port 14 into a cavity 11 flowing by a mobile member 12 and therefrom to the other section of the casing's chamber 4.

In the section where the flow chamber is located a decrease of flow resistance is effected during the backward movement of the piston rod, preserving the same value of the flow resistance in the remaining section of the casing.

During the inward movement of the piston rod 5 in the casing, under the pressure of the elastomer, the mobile member 12 is pressed upon the aperture of the port 14 and thus the flow of the elastomer along this route is interrupted.

The elastomeric shock absorber according to the present invention is characterized by enhanced damping while preserving the highest acceptable limit of impact force and the lowest acceptable limit of reciprocal force.

What is claimed is:

1. An elastomeric shock absorber having enhanced damping characteristics comprising a casing (1) filled with a compressible elastomer; a piston rod (5) immersed in said elastomer; a piston head (6) mounted on said piston rod, said piston head being provided with connecting ports (14) communicating with front and back spaces of said piston head and being equipped with a mobile member (12); said mobile member being located between surface from which said connecting ports emerge as well as a ring or stop block (13); said stop block being mounted on a section of said piston head facing a flow chamber (19, 21–23), wherein said piston head moves into and out of an inner cylindrical surface (18) of said casing and wherein at least one annular groove is provided on said inner surface (18) of the casing, which together with an outer cylindrical surface (17) of the piston head form said flow chamber; said flow chamber shaped as a solid of revolution, and said solid of revolution being selected from the group comprising a cone, a ring, a torus and any combination thereof.

2. A shock absorber according to claim 1 wherein the flow chamber (19) is shaped as a ring.

3. A shock absorber according to claim 1 wherein the inner surface of the flow chamber (21) is shaped as a hollow truncated cone.

4. An elastomeric shock absorber having enhanced damping characteristics comprising a casing (1) filled with a compressible elastomer; a piston rod (5) immersed in said elastomer; a piston head (6) mounted on said piston rod, said piston head being provided with connecting ports (14) communicating with front and back spaces of said piston head and being equipped with a mobile member (12); said mobile member being located between a surface from which said connecting ports emerge as well as a ring or stop block (13); said stop block being mounted on a section of said piston head facing a flow chamber (19, 21–23), wherein said piston head moves into and out of an inner cylindrical surface (18) of said casing; and wherein at least one groove is provided on said inner surface (18) of the casing, which together with an outer cylindrical surface (17) of the piston head form said flow chamber; said flow chamber shaped as a ring, and said shock absorber including another flow chamber (20) shaped as part of a torus.

5. An elastomeric shock absorber having enhanced damping characteristics comprising a casing (1) filled with a compressible elastomer; a piston rod (5) immersed in said elastomer; a piston head (6) mounted on said piston rod, said piston head being provided with connecting ports (14) communicating with front and back spaces of said piston head and being equipped with a mobile member (12); said mobile member being located between a surface from which said connecting ports emerge as well as a ring or stop block (13); said stop block being mounted on a section of said piston head facing a flow chamber (19, 21–23), wherein said piston head moves into and out of an inner cylindrical surface (18) of said casing; and wherein at least one groove is provided on said inner surface (18) of the casing, which together with an outer cylindrical surface (17) of the piston head form said flow chamber (22); said flow chamber shaped in the form of two hollow cones merging with a ring.

\* \* \* \* \*